Patented June 1, 1926.

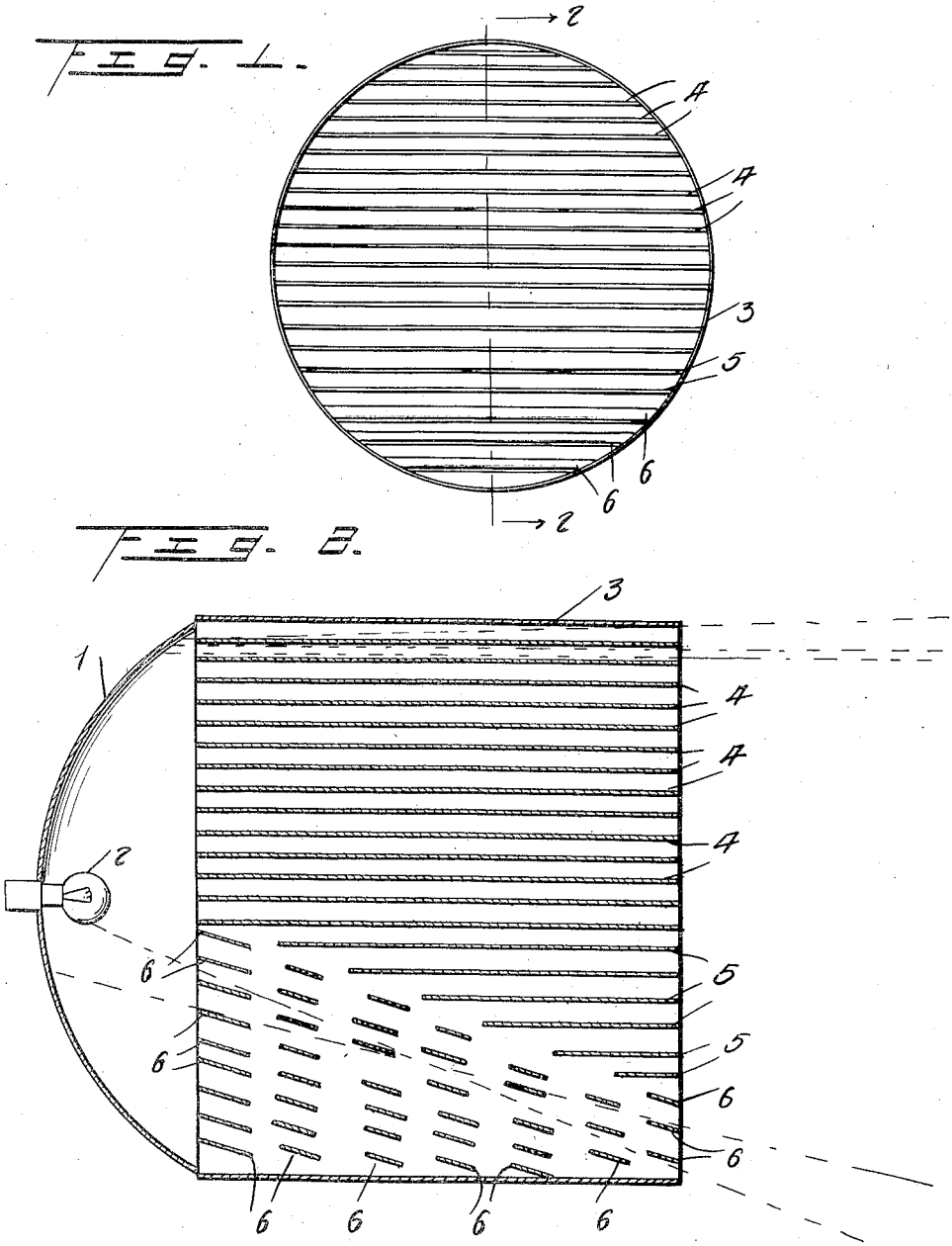

1,587,434

UNITED STATES PATENT OFFICE.

HOWARD L. SMITH, OF CLARKSVILLE, TENNESSEE.

ANTIGLARE HEADLIGHT.

Application filed July 2, 1925. Serial No. 41,186.

The invention relates to motor vehicle headlights and has for its object to provide a headlight for properly illuminating the roadway while at the same time preventing the glare which is blinding and otherwise objectionable to the driver of a vehicle approaching in the opposite direction.

Other objects and advantages will be apparent and suggest themselves as the nature of the invention is understood.

While the drawings illustrate an embodiment of the invention it is to be understood that in adapting the same to meet different conditions and requirements, various changes in the form, proportion, and minor details of construction may be resorted to without departing from the spirit of the invention.

Referring to the accompanying drawings forming a part of the application;

Figure 1 is a front view of a headlight embodying the invention, and

Figure 2 is an enlarged sectional view on the line 2—2 of Figure 1, the dotted lines showing projected rays of light.

Corresponding and like parts are referred to in the following description and designated in the several views of the drawings by like reference characters.

The numeral 1 denotes the reflector of a headlight of any improved construction, and 2 is the usual electric bulb. The attachment comprises a frame 3 which is of circular outline and adapted to be connected to the body of the lamp in any preferred way. Within the upper portion of the frame 3 the upper half of the frame 3 is provided with a plurality of closely related planes 4 which are disposed horizontally and in parallel relation, said planes extending from one side of the frame to the other, and serving to direct the rays of light forwardly in horizontal lines. Other planes 5 are located in the lower portion of the frame 3 and progressively decrease in width, the top plane of this series being nearly equal in width to the planes 4 and the bottom plane relatively narrow. The forward edges of the planes 4 and 5 touch a vertical plane. The series of planes 5 terminate a short distance from the bottom of the frame 3 and the space provided in the rear thereof receives a plurality of narrow planes 6 which extend from one side of the frame 3 to the opposite side and which incline forwardly and downwardly. This series of planes 6 are provided in vertical lines and the planes of one line have a staggered arrangement to the planes of the adjacent line, as shown most clearly in Figure 2, and this arrangement provides for a forward and downward direction of the rays of light, whereby to illuminate a roadway immediately in front of the vehicle. The vertical lines of planes 6 are spaced apart. The several planes 4, 5, and 6 are formed of non-reflecting material and they operate to direct the rays of light without reflecting, deflecting, or diffusing the same, the rays of light passing through the passages formed between the planes which operate as directing means therefor.

What is claimed is:—

1. Means for directing the rays of light of a headlight, the same comprising a plurality of planes disposed in spaced vertical lines and inclined forwardly and downwardly, the one in advance of the other and the planes of one line having an approximate staggered arrangement to the planes of the adjacent lines.

2. Means for controlling the rays of light of a headlight, the same comprising a horizontal series of planes, the lowermost planes gradually and progressively decreasing in width, and other planes disposed in the rear of the narrowing planes and inclined forwardly and downwardly, said other planes arranged in a plurality of vertical series, the planes of each series being in staggered relation to the planes of adjacent series.

3. Light controlling means comprising a plurality of horizontally disposed planes, the lower planes gradually decreasing in width, and other planes arranged in the rear of the narrowing planes and disposed in spaced vertical lines and inclining forwardly and downwardly and having the planes of one line disposed in an approximate staggered relation to the planes of the adjacent line.

In testimony whereof I affix my signature.

HOWARD L. SMITH.